United States Patent
Nilsson et al.

(10) Patent No.: US 12,203,525 B2
(45) Date of Patent: Jan. 21, 2025

(54) CENTRIFUGAL PENDULUM ABSORBER

(71) Applicant: VOLVO TRUCK CORPORATION, Gothenburg (SE)

(72) Inventors: Ola Nilsson, Varberg (SE); Pär Öhrfeldt, Mölnlycke (SE); Ödül Bilen, Hsings Backa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 13 days.

(21) Appl. No.: 17/605,048

(22) PCT Filed: Apr. 25, 2019

(86) PCT No.: PCT/EP2019/060653
§ 371 (c)(1),
(2) Date: Oct. 20, 2021

(87) PCT Pub. No.: WO2020/216448
PCT Pub. Date: Oct. 29, 2020

(65) Prior Publication Data
US 2022/0186812 A1 Jun. 16, 2022

(51) Int. Cl.
*F16F 15/14* (2006.01)

(52) U.S. Cl.
CPC ........ *F16F 15/145* (2013.01); *F16F 2222/08* (2013.01); *F16F 2232/02* (2013.01); *F16F 2236/08* (2013.01)

(58) Field of Classification Search
None
See application file for complete search history.

(56) References Cited

U.S. PATENT DOCUMENTS 10,190,653 B2 * 1/2019 Siemens ................ F16H 45/02

FOREIGN PATENT DOCUMENTS

| CN | 102245928 A | 11/2011 |
| CN | 102918296 A | 2/2013 |

(Continued)

OTHER PUBLICATIONS

International Search Report and Written Opinion of the International Searching Authority, PCT/EP2019/060653, mailed Jan. 24, 2020, 8 pages.

(Continued)

*Primary Examiner* — Vicky A Johnson
(74) *Attorney, Agent, or Firm* — Sage Patent Group

(57) ABSTRACT

The disclosure relates to a centrifugal pendulum absorber for a flywheel, including,
a plurality of pendulum weights being arranged circumferentially around a center axis (C) of the centrifugal pendulum absorber, each pendulum weight being configured to be movable along a predetermined pendulum path during use, wherein,
the centrifugal pendulum absorber further including at least one stopping element for at least one of the pendulum weights which is positioned such that it defines an end point of the predetermined pendulum path, at which end point the at least one of the pendulum weights is configured to come into contact with the at least one stopping element, wherein at least a portion of the at least one stopping element which is intended to contact the at least one pendulum weight includes a copper alloy, such as brass and/or bronze.

20 Claims, 5 Drawing Sheets

(56) References Cited

FOREIGN PATENT DOCUMENTS

| CN | 106662206 A | 5/2017 | | |
|---|---|---|---|---|
| CN | 108458046 A | 8/2018 | | |
| DE | 10-2016-205765 A1 | 10/2017 | | |
| DE | 10-2017-108465 A1 | 10/2017 | | |
| EP | 2933527 A1 | 10/2015 | | |
| FR | 102011086436 A1 | 6/2012 | | |
| FR | 3049033 A1 | 9/2017 | | |
| WO | WO-2010066218 A1 | * 6/2010 | ............ | F16F 15/145 |
| WO | WO 2013/156733 A1 | 10/2013 | | |

OTHER PUBLICATIONS

International Preliminary Report on Patentability, PCT/EP2019/060653, mailed Mar. 26, 2021, 6 pages.
Extended European Search Report for EP Patent Application No. 23167928.3, mailed Jul. 26, 2023, 10 pages.

* cited by examiner

CENTRIFUGAL PENDULUM ABSORBER

CROSS REFERENCE TO RELATED APPLICATIONS

This application is a 35 U.S.C. § 371 national stage application of PCT International Application No. PCT/EP2019/060653 filed on Apr. 25, 2019, the disclosure and content of which is incorporated by reference herein in its entirety.

TECHNICAL FIELD

The invention relates to a centrifugal pendulum absorber for a flywheel. The invention further relates to a flywheel arrangement for an internal combustion and to a vehicle.

The invention can be applied in vehicles, such as trucks, buses and construction equipment. Although the invention will be described with respect to heavy-duty trucks, the invention is not restricted to this particular vehicle, but may also be used in other vehicles such as light-weight trucks, articulated haulers, excavators, wheel loaders, and backhoe loaders.

BACKGROUND

It is known to connect a flywheel to a crankshaft of an internal combustion engine for a vehicle. The flywheel is used for evening out uneven power output from the engine, which is caused by uneven power output from each cylinder of the engine during the cylinder's combustion cycle.

It is further known to connect a centrifugal pendulum absorber to the flywheel for reducing vibrations from the crankshaft. Vibrations have been found to be more common for more fuel efficient engines. By the trend of reducing fuel consumption, engine vibrations have thereby become a more common issue in modern vehicles. Centrifugal pendulum absorbers for flywheels include a number of pendulum weights arranged circumferentially around a center axis of the flywheel, which pendulum weights are movable with respect to the flywheel, thereby dampening vibrations.

An example of a centrifugal pendulum device is disclosed in DE102016205765 A1. It discloses a centrifugal pendulum device which comprises one or more pendulum masses which can perform pendulum motions relative to a carrier disc. It further comprises a buffer ring which is arranged between the rotation axis and the pendulum weights, wherein the ring can perform a frictional sliding movement relative to the carrier disk by the pendulum motions.

Current centrifugal pendulum absorbers may be difficult to mount to a flywheel in a reliable and cost-efficient manner. Further, it has also been recognized that the pendulum absorbers may provide disturbing noise during use.

SUMMARY

In view of the above, an object of the invention is to provide a centrifugal pendulum absorber and/or a flywheel arrangement having improved performance during use. More particularly, an object is to reduce noise during use and/or to provide a more reliable centrifugal pendulum absorber.

According to a first aspect, the object is achieved by a centrifugal pendulum absorber according to claim 1. According to a second aspect, the object is achieved by a flywheel arrangement according to claim 8. According to a third aspect, the object is achieved by a vehicle according to claim 16.

According to the first aspect thereof, the object is achieved by a centrifugal pendulum absorber for a flywheel, comprising, a plurality of pendulum weights being arranged circumferentially around a center axis of the centrifugal pendulum absorber, each pendulum weight being configured to be movable along a predetermined pendulum path during use, wherein, the centrifugal pendulum absorber further comprises at least one stopping element for at least one of the pendulum weights which is positioned such that it defines an end point of the predetermined pendulum path, at which end point the at least one of the pendulum weights is configured to come into contact with the at least one stopping element, wherein at least a portion of the at least one stopping element which is intended to contact the at least one pendulum weight comprises a copper alloy, such as brass and/or bronze.

By the provision of the centrifugal pendulum absorber as disclosed herein, a more reliable centrifugal pendulum absorber is provided, which also has shown to reduce disturbing noise during use. It has namely been found that there may be disturbing noise coming from an engine's crankshaft during use, and the inventors have realized that this noise may at least partly emanate from the centrifugal pendulum absorber. Hence, by providing stopping elements as disclosed herein, which comprises a copper alloy, such as brass and/or bronze, a significant reduction in unwanted noise from the centrifugal pendulum absorber is achieved. The copper alloy has shown to provide beneficial dampening properties which reduce the noise when the pendulum weight contacts the stopping element. Further, the stopping element provides a reliable configuration which may increase the centrifugal pendulum absorber's service life, which is beneficial for cost reasons.

The predetermined pendulum path herein lies within a plane perpendicular to the center axis. The predetermined pendulum path may be a tautochrone curve.

Optionally, at least 70 volume % of the at least one stopping element may be made of the copper alloy, such as brass and/or bronze. Still optionally, at least 80 or 90 volume % of the at least one stopping element may be made of the copper alloy, such as brass and/or bronze. More particularly, by having a stopping element which is mainly made of the copper alloy, improved dampening properties will be provided, and hence disturbing noise may be effectively reduced.

Optionally, the at least one stopping element may be a separate element. Hence, by making the stopping element as a separate element, it may more easily be replaced when e.g. worn, which is beneficial for servicing.

Optionally, the at least one stopping element may be located radially inwardly with respect to the at least one of the pendulum weights which the at least one stopping element is configured to contact. The inventors have further realized that the positioning of the stopping element may be important for improving durability and reliability of the centrifugal pendulum absorber. In fact, by positioning the stopping element at a radially inward position with respect to the at least one of the pendulum weights, more space may be provided for the pendulum weight at a radially outward location. This in turn is beneficial in that bearing surfaces for providing the pendulum motion can more easily be provided in this space. It has namely been realized that the bearing surfaces can be efficiently lubricated if located in this space, due to that centrifugal forces will force lubricant to move outwards during rotation of the centrifugal pendulum absorber. The improved lubrication will in turn reduce wear, and thereby durability and reliability may be increased.

Optionally, the at least one stopping element may be provided between two circumferentially abutting pendulum weights and positioned such that it defines respective end points of the predetermined pendulum paths of the two circumferentially abutting pendulum weights, at which end points the two abutting pendulum weights are configured to come into contact with the at least one stopping element. Still optionally, the at least one stopping element may be made in one single piece. Thereby, one single stopping element may be used for stopping two pendulum weights.

Optionally, the at least one stopping element may further comprise at least one aperture for receiving a connection member, such as a screw, wherein a smallest distance between the at least one aperture and a contact surface of the at least one stopping element which is intended to contact the at least one pendulum weight during use is 2 millimeters or more, such as 3, 4, 5, 6, 7, 8, 9 or 10 millimeters or more. Still optionally, the smallest distance between the at least one aperture and the contact surface of the at least one stopping element which is intended to contact the at least one pendulum weight during use may have a length such that a maximum impact force on the contact surface caused by the at least one pendulum weight is dampened by at least 70, 80 or 90% until it reaches the aperture, wherein the length is preferably 2 millimeters or more, such as 3, 4, 5, 6, 7, 8, 9 or 10 millimeters or more. Hence, the inventors have realized that in order to reduce noise, and also to reduce the risk of generating unnecessary vibrations, the impact force exerted on the stopping element should preferably be dampened until it reaches the aperture with the connection member.

According to the second aspect thereof, the object is achieved by a flywheel arrangement for an internal combustion engine, comprising, a flywheel configured to be connected to a crankshaft of an engine for common rotation around a center axis, and the centrifugal pendulum absorber according to any one of the embodiments of the first aspect.

Advantages and effects provided by the flywheel arrangement are largely analogous to the advantages and effects provided by the first aspect of the invention. It shall also be noted that each embodiment of the first aspect of the invention is applicable with each embodiment of the second aspect of the invention and vice versa.

Optionally, the at least one stopping element is configured to be releasably attached to the flywheel. Thereby, replacement and/or servicing may be facilitated. The stopping element may namely be a wear component which may need to be replaced after certain time of use.

Optionally, the flywheel arrangement may further comprise a ring member extending in the circumferential direction and located radially outside the plurality of pendulum weights, the ring member having at least one connection portion which connects the ring member to the flywheel, the at least one connection portion extending radially inwardly between two circumferentially abutting pendulum weights, wherein the at least one stopping element at least partly connects the at least one connection portion to the flywheel. Hence, the stopping element may also preferably be used for providing increased strength of the connection of the ring member to the flywheel.

Optionally the ring member may comprise a plurality of bearing surfaces adapted to cooperate with corresponding bearing surfaces of the pendulum weights for allowing the pendulum weights to follow their predetermined pendulum paths during use. It has namely been realized that the bearing surfaces may be more accurately machined in a cost-efficient manner if provided on a separate ring member. In fact, the bearing surfaces on the ring member may in one embodiment be machined subsequently to attaching the ring member to the flywheel. Still optionally, the ring member may be made of a steel alloy, preferably a bearing steel, which provides high strength and durability. Still optionally, the flywheel may be made of iron, such as cast iron, preferably grey cast iron. Hence, it has been found to be preferred to provide the ring member and the flywheel with different materials.

Optionally, the flywheel arrangement may further comprise rolling elements interposed in-between the cooperating bearing surfaces and configured to cooperate with the cooperating bearing surfaces of the ring member and the pendulum weights to provide the predetermined pendulum paths.

Optionally, the at least one stopping element may be provided in a receiving section of the flywheel which circumferentially locates the at least one stopping element with respect to the flywheel. Still optionally, the receiving section may be a recess provided on the flywheel.

Optionally, the at least one stopping element may comprise at least one aperture and the at least one stopping element is connected to the flywheel by at least one connection member provided in the at least one aperture, preferably by two connection members provided in a first and second circumferentially offset apertures of the stopping element.

According to the third aspect thereof, the object is achieved by a vehicle comprising the centrifugal pendulum absorber according to any one of the embodiments of the first aspect or the flywheel arrangement according to any one of the embodiments of the second aspect.

Advantages and effects provided by the vehicle are largely analogous to the advantages and effects provided by the first and second aspects of the invention. It shall also be noted that each embodiment of the first and second aspects of the invention is applicable with each embodiment of the third aspect of the invention and vice versa. Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
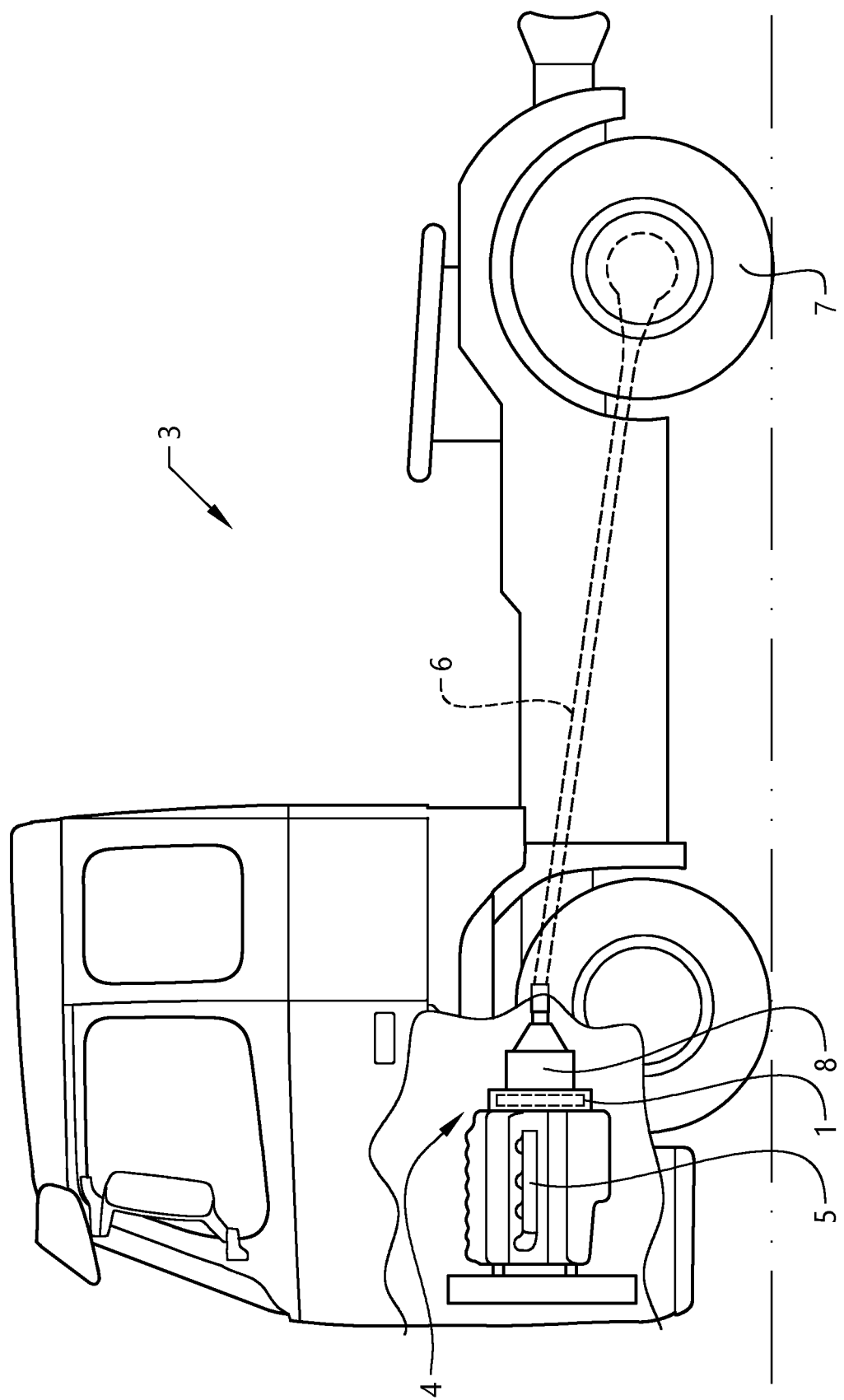
FIG. 1 schematically shows a vehicle according to an embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIG. 1 schematically shows a vehicle 3, in the form of a heavy-duty truck, according to an embodiment of the invention. The vehicle 3 includes a powertrain 4 with an engine 5 connected to a crankshaft (not shown), to which a flywheel arrangement 1 is connected for common rotation. A drive shaft 6 connects the engine 5 to driving wheels 7 of the vehicle 3 via a transmission 8 connected to the flywheel via a clutch (not shown).

Figure 2:
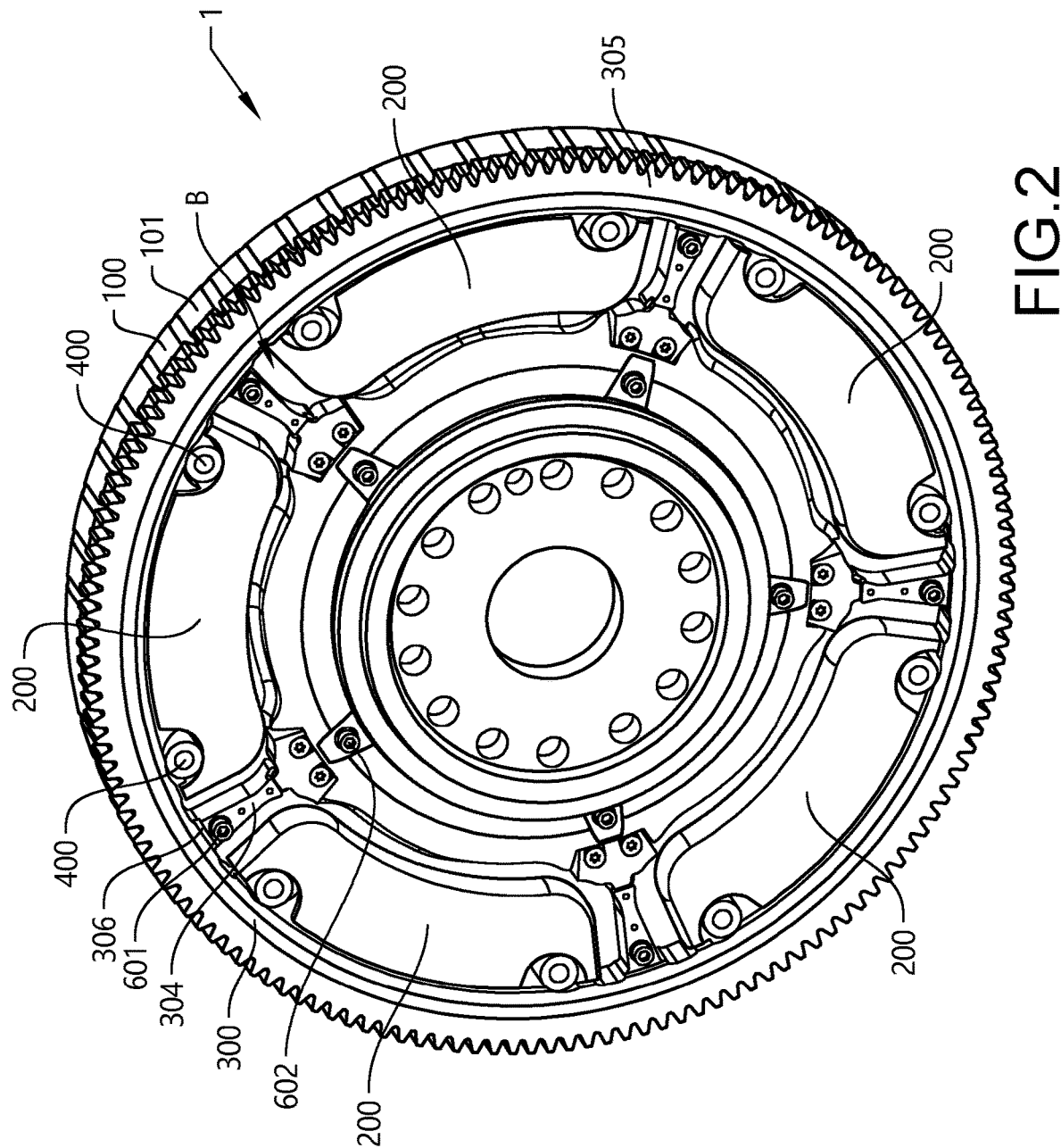
FIG. 2 is a perspective view of a flywheel arrangement according to an embodiment of the invention.
Figure 3:
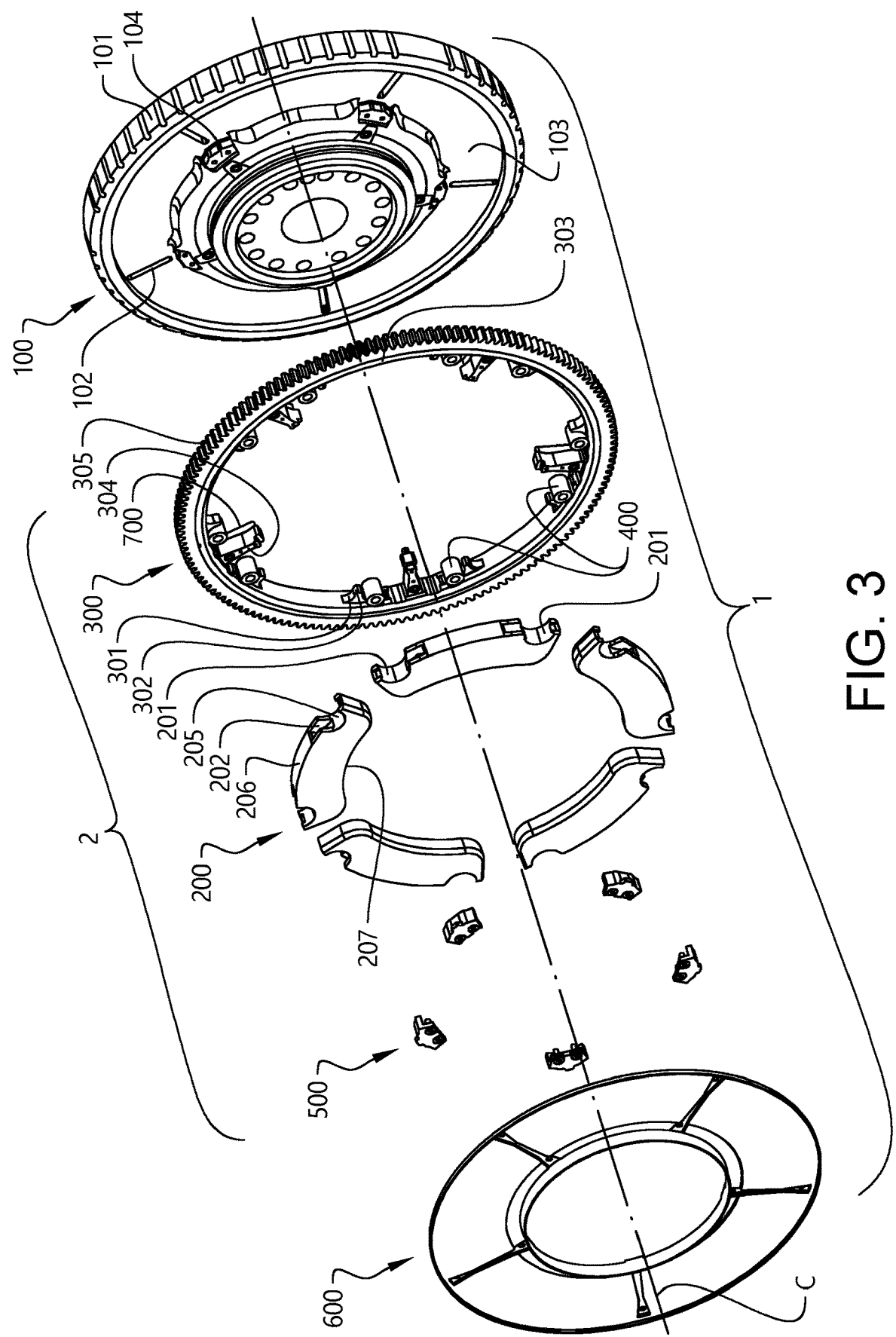
FIG. 3 is an exploded view of the flywheel arrangement in FIG. 2.
Figure 4:
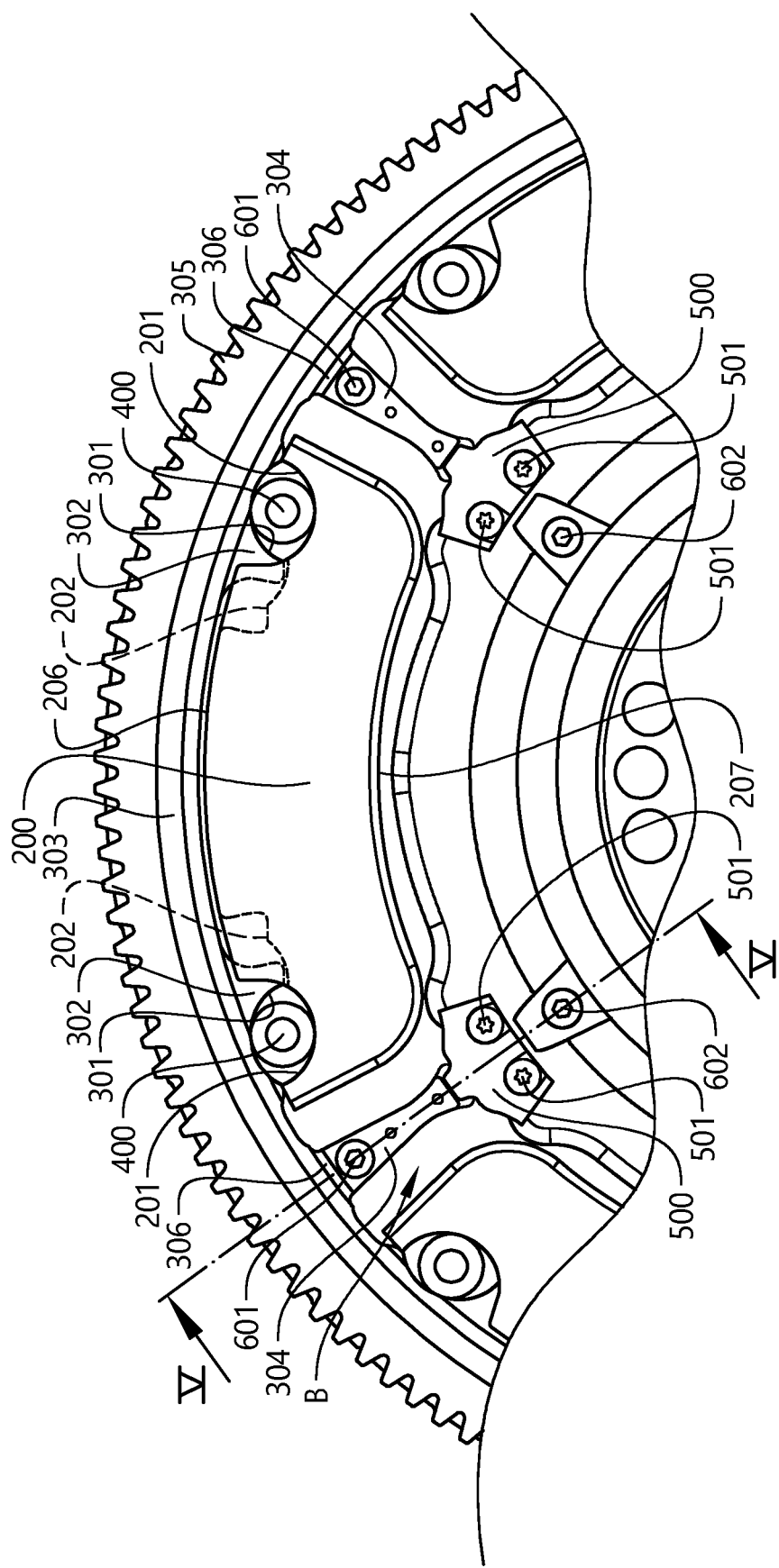
FIG. 4 is a planar view showing a portion of the flywheel arrangement in FIG. 2.

A flywheel arrangement 1 according to an embodiment of the invention is shown in closer detail in FIG. 2. Reference is also made to FIG. 3, in which the flywheel arrangement 1 is shown in an exploded view, and to FIG. 4, showing a portion of the flywheel arrangement in closer detail. The flywheel arrangement 1 comprises a flywheel 100 configured to be connected to a crankshaft of an engine for common rotation around a center axis C, and a centrifugal pendulum absorber 2. The centrifugal pendulum absorber 2 comprises a plurality of pendulum weights 200 which are arranged circumferentially around the center axis C, and each pendulum weight is configured to be movable along a predetermined pendulum path during use. In this embodiment, there are five pendulum weights 200, even though there may be fewer and more pendulum weights, which are circumferentially arranged between the center axis C and a radially peripheral surface 101 of the flywheel 100, facing a side face 103 of the flywheel 100. The centrifugal pendulum absorber 2 further comprises a separate ring member 300 which extends in the circumferential direction and is located radially outside the pendulum weights 200. The ring member 300 comprises an annular main portion 303 which has five connection portions 304 which connects the ring member 300 to the flywheel 100 via connection apertures 102 on the flywheel 100. The annular main portion 303 is preferably press-fitted into the flywheel 100. The connection portions 304 extend radially inwardly between each two circumferentially abutting pendulum weights 200. Further, the ring member 300 is preferably made of bearing steel, which is for example beneficial for producing bearing surfaces 301 of the ring member 300 with high precision. The flywheel 100 on the other hand is preferably made of iron, such as cast iron, preferably grey cast iron. In this way, high thermal conductivity and good damping properties are achieved.

The flywheel arrangement 1 further comprises a cover plate 600 provided at an axial side face 103 of the flywheel 100 to cover the pendulum weights 200 from an outside environment. The cover plate 600 is here attached to the ring member 300 via a screw 601 and to the flywheel 100 via a screw 602.

Each pendulum weight 200 has a basic shape of an annulus sector as seen in a plane (or section) perpendicular to the central axis C. Thus, an outer peripheral surface 206 of the pendulum weight 200, facing the ring member 300, is a convex surface with a first radius of curvature, and an inner peripheral surface 207 of the pendulum weight 200 is a concave surface with a second radius of curvature, which is smaller than the first radius of curvature. Inner bearing surfaces 201 are provided on recesses 205 formed in the outer peripheral surface 206 of the pendulum weight 200.

The centrifugal pendulum absorber 2 further comprises at least one stopping element 500 for at least one of the pendulum weights 200 which is positioned such that it defines an end point of the predetermined pendulum path, at which end point the at least one of the pendulum weights is configured to come into contact with the at least one stopping element. Further, according to this embodiment, at least a portion of the at least one stopping element which is intended to contact the at least one pendulum weight 200 comprises a copper alloy, such as brass and/or bronze. Thereby, the impact force exerted on the stopping element 500 can be efficiently dampened during use. In this embodiment, five stopping elements 500 are provided for the five pendulum weights 200. Hence, each one of the stopping elements 500 is configured to provide end points for the respective pendulum paths of two circumferentially abutting pendulum weights. Furthermore, in this embodiment, each stopping element 500 connects each connection portion 304 to the flywheel 100, where an example connection will be further described in the below.

With respect to especially FIG. 3, it can be seen that the five stopping elements 500 are separate elements. Hence, by making the stopping elements 500 as separate elements, they may more easily be replaced when e.g. worn, which is beneficial for servicing. The stopping elements 500 are in this particular embodiment attached to the flywheel arrangement 1 by screws 501, although any other type of means for attaching may be used.

As can be further seen, the stopping elements 500 are in this embodiment located radially inwardly with respect to the pendulum weights 200 which the stopping elements 500 are configured to contact during use. Thereby, more space is provided for the pendulum weights 200 at a radially outward location. By providing the stopping elements 500 at this location, the pendulum motion for each pendulum weight 200 can be provided by the cooperating bearing surfaces 201, 301 of the weights 200 and of the separate ring member 300, respectively. Thereby, the cooperating bearing surfaces 201, 301 can be efficiently lubricated in this radially outer space, due to that centrifugal forces will force lubricant to move outwards during rotation of the centrifugal pendulum absorber 2. The improved lubrication will in turn reduce wear, and thereby durability and reliability may be increased. In this embodiment, rolling elements 400, in the form of rollers, are provided in-between the bearing surfaces 201, 301. The bearing surfaces 201, 301, together with the rolling elements 400, are configured to provide a pendulum motion along a predetermined pendulum path for each one of the pendulum weights 200. There are two circumferentially separated rolling elements 400 for each pendulum weight 200. According to an embodiment, this may be denoted a bifilar pendulum configuration. Optionally, the pendulum motion may be a so called tautochronic pendulum motion.

The ring member 300 of this embodiment further comprises a plurality of protrusions 302 extending radially inwards from the annular main portion 303. The outer bearing surface 301 is formed at least partly on such a protrusion 302. The pendulum weight 200 comprises two pockets 202 formed in the outer peripheral surface 206 in connection with each of the inner bearing surfaces 201, wherein each pocket 202 is configured to receive a portion of one of the protrusions 302 during use of the flywheel arrangement 1, when the pendulum weight 200 moves along the predetermined pendulum path.

Still further, in the embodiment shown in FIGS. 2-4, each stopping element 500 is provided between two circumferentially abutting pendulum weights 200 and positioned such that it defines respective end points of the predetermined pendulum paths of the two circumferentially abutting pendulum weights 200, at which end points the two abutting pendulum weights are configured to come into contact with the stopping element 500. Still further, as shown in this embodiment, each stopping element 500 is made in one single piece, although they also may be made by more than one piece.

As can be further seen, each stopping element 500 is provided in a receiving section 104 of the flywheel 100 which circumferentially locates each stopping element 500 with respect to the flywheel 100. The receiving section 104 is in the form of a recess on the flywheel 1, providing a seat surface for the stopping element 500. The receiving section 104 defines the position for the stopping element 500, resulting in a robust connection to the flywheel 100. Further, the receiving section 104 has shown to facilitate servicing and maintenance operations since it provides a predetermined position for the stopping element 500. Thereby, a technician may not need to spend unnecessary time on positioning each stopping element 500 during maintenance/repair work.

Further, each stopping element 500 comprises two apertures 502, 503 and each stopping element 500 is connected to the flywheel 1 by the two connection members 501, here in the form of screws, provided in the apertures. The two apertures 502, 503 are circumferentially offset relative each other.

The flywheel 100, the ring member 300 and the cover plate 600 together form five closed compartments B which sealingly encloses each respective pendulum weight 200. Thereby, the closed compartments B can be filled with lubricant (not shown), which preferably is grease. In this embodiment, the ring member 300 defines a radially outer wall for the plurality of closed compartments B. Furthermore, the connection portions 304 define circumferentially opposing end walls for each closed compartment B. To improve lubrication and to balance the amount of grease between the closed compartments B, a channel for fluid 306 is provided between each two abutting closed compartments B, as seen in the circumferential direction, and the channels for fluid 306 fluidly connects each two abutting closed compartments. Hence, the closed compartments B together form one closed space which accommodates lubricant. Each channel for fluid 306 further has its main extension in the circumferential extension of the flywheel arrangement 100. The cover plate 600 is shown in FIGS. 3 and 5, and has been omitted in FIGS. 2 and 4 to more clearly show the other parts of the flywheel arrangement and the centrifugal pendulum absorber.

Figure 5:
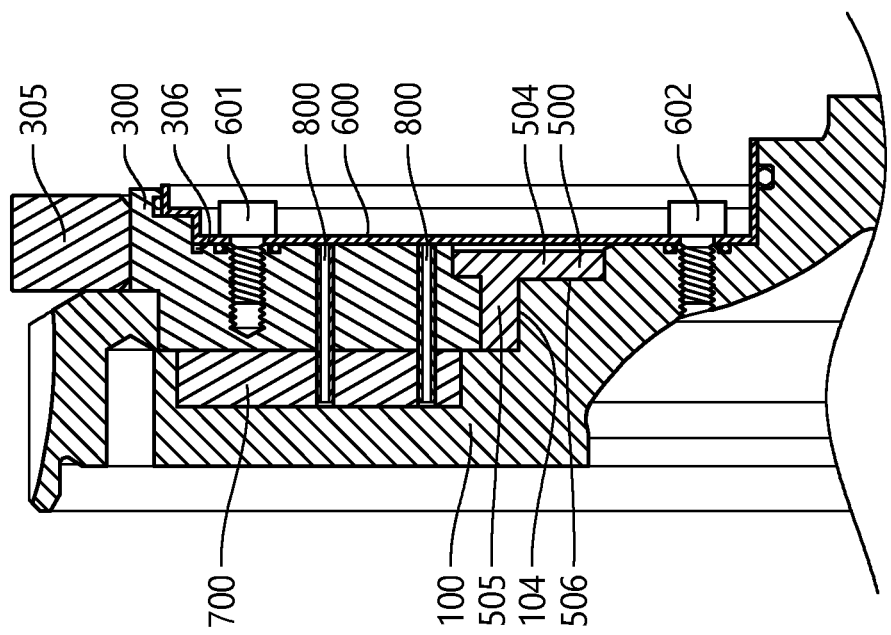
FIG. 5 is a cross-section along the line V-V in FIG. 4.

FIG. 5 shows a cross sectional view along the line V-V of the flywheel arrangement 100 as e.g. shown in FIG. 4. The cross section is taken along a plane which is defined by the center axis C and a second axle which intersects and is perpendicular to the center axis C. As can be seen, the stopping element 500 is provided at a radially inward location. As can be further seen, the stopping element 500 is formed by a first radially extending portion 504 and a second axially extending portion 505. The two portions 504, 505 defines a connection surface 506 for the stopping element 500, which in this embodiment is L-shaped. Thereby, the connection surface 506 together with the receiving section 104 provides a reliable connection interface. Still further, in this embodiment, the stopping element has a somewhat T-shaped configuration in its cross sectional view. More particularly, the first portion 504 extends radially upwards and radially downwards with respect to the second portion 505. As can be further seen, the first portion 504 has a main extension radially downwards with respect to the second portion 505. This configuration has shown to further facilitate assembly work, and also to provide a robust connection. The part of the first portion 504 which extends radially upwards with respect to the second portion 505 is here configured to be in contact with the radially inwardly extending connection portion 304 of the ring member 300, thereby providing improved axial retention for the ring member 300.

Further in FIG. 5, one of the channels for fluid 306 is shown. The channel 306 is here provided as a circumferentially extending recess on the connection portion 304 of the ring member 300 which is covered by the cover plate 600. It shall however be understood that the channels 306 may be provided at any member located between each two abutting closed compartments B. Further, the channel 306 is provided at a radial top region between the closed compartments B. Thereby, grease can more easily flow between the closed compartments B when the flywheel arrangement 1 is rotating. Further, the channel for fluid 306 will be provided close to the cooperating bearing surfaces 201, 301, which also are located at a radial top region. A number of sealing elements, preferably O-rings, are also provided for efficiently sealing off the closed compartments B, thereby avoiding lubricant leakage during use.

A plurality of key members 700 are further provided, by means of which the ring member 300 is secured to the flywheel 100. Each key member 700 is, as shown in a sectional view in FIG. 5, fitted into a radially extending keyseat 102 provided in the flywheel 100 and each key member 700 is further attached to the radially extending connection portion 304 of the ring member 300 using fastening members in the form of e.g. nails, pins or screws via a hole 800 extending through the ring member 300 and at least partly into the key member 700. The key members 700 and the ring member 300 may thus be formed as separate pieces, but they may also be formed in one piece. The key members 700 and the ring member 300 may be made of the same material.

The ring member 300 further comprises a ring gear 305, which may be a separate part or which may be formed integrally with the ring member 300.

Figure 6:
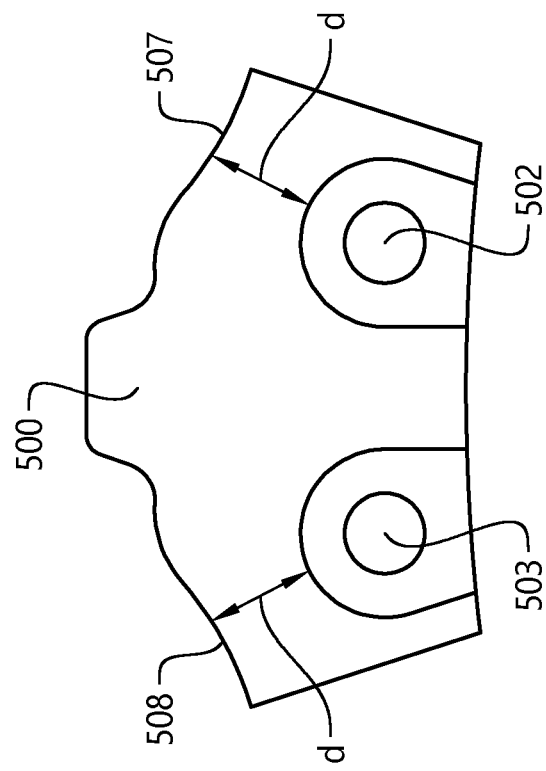
FIG. 6 is an enlarged view of a stopping element according to an embodiment of the invention.

In FIG. 6, an enlarged view of a stopping element 500 is shown. The stopping element comprises two apertures 502, 503 for receiving e.g. screws 501 as explained in the above. The complete stopping element 500, i.e. 100 volume %, is made of bronze, thereby providing beneficial dampening properties during use. Still further, a smallest distance d between each aperture 502, 503 and its respective closest contact surface, 507 and 508, of the stopping element 500 which is intended to contact one of the pendulum weights 200 is here substantially 10 millimeters.

In the following, possible features and feature combinations of the centrifugal pendulum absorber and the flywheel arrangement are disclosed, presented as items:

1. A centrifugal pendulum absorber for a flywheel, comprising:
   a plurality of pendulum weights being arranged circumferentially around a center axis of the centrifugal pendulum absorber, each pendulum weight being configured to be movable along a predetermined pendulum path during use, characterized in that, the centrifugal pendulum absorber further comprising at least one stopping element for at least one of the pendulum weights which is positioned such that it defines an end point of the predetermined pendulum path, at which end point the at least one of the pendulum weights is configured to come into contact with the at least one stopping element, wherein the at least one stopping element is located radially inwardly with respect to the at least one of the pendulum weights which the at least one stopping element is configured to contact.

2. The centrifugal pendulum absorber according to item 1, wherein at least a portion of the at least one stopping element which is intended to contact the at least one pendulum weight comprises a copper alloy, such as brass and/or bronze.

3. The centrifugal pendulum absorber according to item 2, wherein at least 70 volume of the at least one stopping element is made of the copper alloy, such as brass and/or bronze.

4. The centrifugal pendulum absorber according to any one of the preceding items, wherein the at least one stopping element is a separate element.

5. The centrifugal pendulum absorber according to any one of the preceding items, wherein the at least one stopping element is provided between two circumferentially abutting pendulum weights and positioned such that it defines respective end points of the predetermined pendulum paths of the two circumferentially abutting pendulum weights, at which end points the two abutting pendulum weights are configured to come into contact with the at least one stopping element.

6. The centrifugal pendulum absorber according to item 5, wherein the at least one stopping element is made in one single piece.

7. The centrifugal pendulum absorber according to any one of the preceding items, wherein the at least one stopping element further comprises at least one aperture for receiving a connection member, such as a screw, wherein a smallest distance between the at least one aperture and a contact surface of the at least one stopping element which is intended to contact the at least one pendulum weight during use is 2 millimeters or more, such as 3, 4, 5, 6, 7, 8, 9 or 10 millimeters or more.

8. A flywheel arrangement for an internal combustion engine, comprising,
a flywheel configured to be connected to a crankshaft of an engine for common rotation around a center axis, and
the centrifugal pendulum absorber according to any one of the preceding items.

9. The flywheel arrangement according to item 8, wherein the at least one stopping element is configured to be releasably attached to the flywheel.

10. The flywheel arrangement according to any one of items 8-9, further comprising a ring member extending in the circumferential direction and located radially outside the plurality of pendulum weights, the ring member having at least one connection portion which connects the ring member to the flywheel, the at least one connection portion extending radially inwardly between two circumferentially abutting pendulum weights, wherein the at least one stopping element at least partly connects the at least one connection portion to the flywheel.

11. The flywheel according to item 10, wherein the ring member comprises a plurality of bearing surfaces adapted to cooperate with corresponding bearing surfaces of the pendulum weights for allowing the pendulum weights to follow their pendulum paths during use.

12. The flywheel arrangement according to item 11, further comprising rolling elements interposed in-between the cooperating bearing surfaces and configured to cooperate with the cooperating bearing surfaces of the ring member and the pendulum weights to provide the predetermined pendulum paths.

13. The flywheel arrangement according to any one of items 8-12, wherein the at least one stopping element is provided in a receiving section of the flywheel which circumferentially locates the at least one stopping element with respect to the flywheel.

14. The flywheel arrangement according to item 13, wherein the receiving section is a recess provided on the flywheel.

15. The flywheel according to any one of items 8-14, wherein the at least one stopping element comprises at least one aperture and the at least one stopping element is connected to the flywheel by at least one connection member provided in the at least one aperture, preferably by two connection members provided in a first and second circumferentially offset apertures of the stopping element.

16. A vehicle comprising the centrifugal pendulum absorber according to any one of items 1-7 or the flywheel according to any one of items 8-15.

It is to be understood that the present invention is not limited to the embodiments described above and illustrated in the drawings; rather, the skilled person will recognize that many changes and modifications may be made within the scope of the appended claims.

The invention claimed is:

1. A centrifugal pendulum absorber for a flywheel, comprising:
a plurality of pendulum weights being arranged circumferentially around a center axis (C) of the centrifugal pendulum absorber, each pendulum weight being configured to be movable along a predetermined pendulum path during use, wherein the centrifugal pendulum absorber further comprises at least one stopping element for at least one of the pendulum weights, wherein the at least one stopping element is inflexible and is positioned adjacent to a distal end of the at least one of the pendulum weights and defines an end point of the predetermined pendulum path, at which end point the at least one of the pendulum weights is configured to come into contact with the at least one stopping element, wherein at least a portion of the at least one stopping element which is intended to contact the at least one pendulum weight comprises a copper alloy.

2. The centrifugal pendulum absorber according to claim 1, wherein at least 70 volume % of the at least one stopping element is made of the copper alloy.

3. The centrifugal pendulum absorber according to claim 1, wherein the at least one stopping element is a separate element.

4. The centrifugal pendulum absorber according to claim 1, wherein the at least one stopping element is located radially inwardly with respect to the at least one of the pendulum weights which the at least one stopping element is configured to contact.

5. The centrifugal pendulum absorber according to claim 1, wherein the at least one stopping element is provided between two circumferentially abutting pendulum weights and positioned such that it defines respective end points of the predetermined pendulum paths of the two circumferentially abutting pendulum weights, at which end points the two abutting pendulum weights are configured to come into contact with the at least one stopping element.

6. The centrifugal pendulum absorber according to claim 5, wherein the at least one stopping element is made in one single piece.

7. The centrifugal pendulum absorber according to claim 1, wherein the at least one stopping element further comprises at least one aperture for receiving a connection member, wherein a smallest distance (d) between the at least one aperture and a contact surface of the at least one stopping element which is intended to contact the at least one pendulum weight during use is 2 millimeters or more.

8. The centrifugal pendulum absorber according to claim 7, wherein the connection member comprises a screw.

9. A flywheel arrangement for an internal combustion engine, comprising,
a flywheel configured to be connected to a crankshaft of an engine for common rotation around a center axis (C), and
the centrifugal pendulum absorber according to claim 1.

10. The flywheel arrangement according to claim 9, wherein the at least one stopping element is configured to be releasably attached to the flywheel.

11. The flywheel arrangement according to claim 9, further comprising a ring member extending in the circumferential direction and located radially outside the plurality of pendulum weights, the ring member having at least one connection portion which connects the ring member to the flywheel, the at least one connection portion extending radially inwardly between two circumferentially abutting pendulum weights, wherein the at least one stopping element at least partly connects the at least one connection portion to the flywheel.

12. The flywheel arrangement according to claim 11, wherein the ring member comprises a plurality of bearing surfaces adapted to cooperate with corresponding bearing surfaces of the pendulum weights for allowing the pendulum weights to follow their pendulum paths during use.

13. The flywheel arrangement according to claim 12, further comprising rolling elements interposed in-between the cooperating bearing surfaces and configured to cooperate with the cooperating bearing surfaces of the ring member and the pendulum weights to provide the predetermined pendulum paths.

14. The flywheel arrangement according to claim 9, wherein the at least one stopping element is provided in a receiving section of the flywheel which circumferentially locates the at least one stopping element with respect to the flywheel.

15. The flywheel arrangement according to claim 14, wherein the receiving section is a recess provided on the flywheel.

16. The flywheel arrangement according to claim 9, wherein the at least one stopping element comprises at least one aperture and the at least one stopping element is connected to the flywheel by at least one connection member provided in the at least one aperture.

17. The centrifugal pendulum absorber according to claim 16, wherein the at least one connection member comprises two connection members provided in a first and second circumferentially offset apertures of the stopping element.

18. A vehicle comprising the flywheel arrangement according to claim 9.

19. A vehicle comprising the centrifugal pendulum absorber according to claim 1.

20. The centrifugal pendulum absorber according to claim 1, wherein the copper alloy comprises at least one of brass and/or bronze.

* * * * *